DONALD J. ADRIAN
*INVENTOR.*

BY *J. M. Phillips*
*J. M. St. Amand*
ATTORNEYS

United States Patent Office 3,166,747
Patented Jan. 19, 1965

3,166,747
FM-AM CORRELATION RADAR SYSTEM
Donald J. Adrian, Corona, Calif., assignor to the United States of America as represented by the Secretary of the Navy
Filed Feb. 7, 1961, Ser. No. 87,723
1 Claim. (Cl. 343—14)
(Granted under Title 35, U.S. Code (1952), sec. 266)

The invention herein described may be manufactured and used by or for the Government of the United States of America for governmental purposes without the payment of any royalties thereon or therefor.

The present invention relates to an FM-AM correlation radar system and more particularly to an FM-AM correlation radar system which has a reduced response to zero delayed signals. One of the major problems of known noise modulated radar systems has been the leakage of zero delayed signals (antenna feed through) from the transmitter to the receiver.

Accordingly, an object of the present invention is the provision of an improved radar system wherein antenna isolation requirements are greatly reduced.

Another object is to provide an improved radar system wherein any received signal having zero delay will not appear in the intermediate frequency stage output.

Other objects and many of the attendant advantages of this invention will become readily appreciated as the same becomes better understood by reference to the following detailed description when considered in connection with the accompanying drawings wherein.

Figure 1:
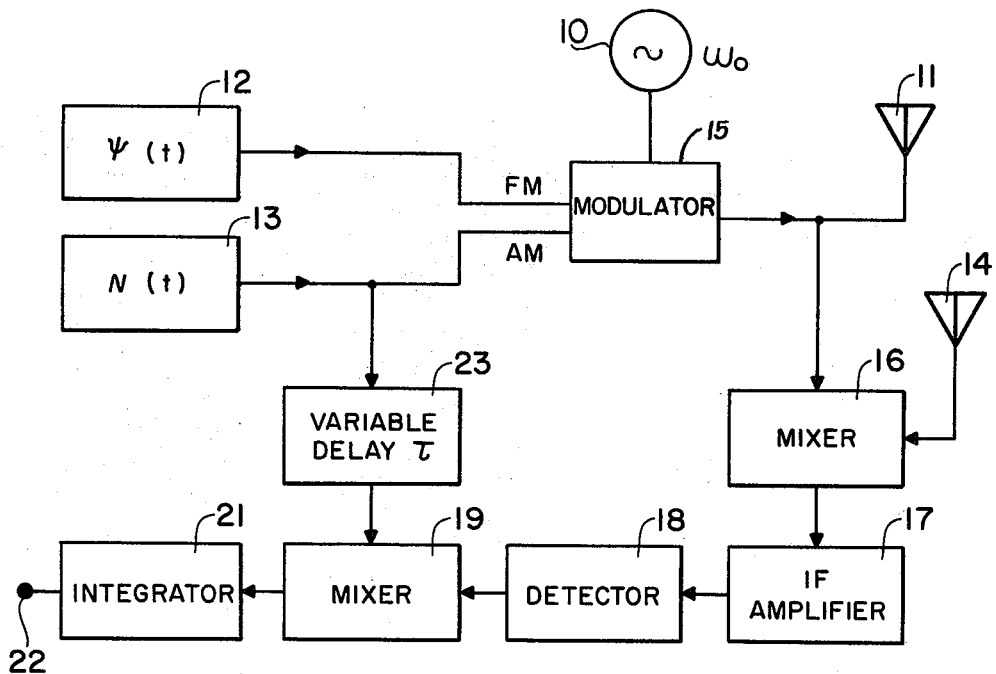
FIGURE 1 shows a block diagram of one embodiment of the invention.

Referring now to the drawing, there is shown a source of RF energy, oscillator 10, coupled to transmitting antenna 11 through modulator 15. The RF energy supplied by oscillator 10 is FM modulated by a signal from FM signal generator 12 and AM modulated by an AM signal from AM signal generator 13. In practice, if the RF energy source is a klystron, the modulation is accomplished by applying the signals to the power supply voltages. The reflected signal received in receiving antenna 14 is mixed in mixer 16, amplified in intermediate amplifier 17, detected in detector 18, mixed in mixer 19, integrated in integrator 21 and coupled to terminal 22 which may be coupled to a cathode ray tube indicator. The output of modulator 15 is coupled directly as an input to mixer 16 and the output of signal generator 13 is coupled through a variable delay circuit 23 as an input to mixer 19. The operation of the circuit can best be understood when considered with the following: The transmitting signal is an amplitude and frequency modulated carrier, thus where $$V_T = A[1+N(t)] \cos [w_o t + \Psi(t)] \quad (1)$$

$W_o$=carrier frequency
$V_T$=transmitted carrier
$A$=constant
$N(t)$=noise, amplitude modulating signal
$\Psi(t)$=frequency modulating signal The signal, $V_T$, is reflected and mixed in mixer 16 giving:

$$V_m = KA[1+N(t-\tau)] \cos [W_d t + \Psi(t) - \Psi(t-\tau)] \quad (2)$$

where
$V_m$=output of mixer 16
$K$=space attenuation constant
$\tau$=twice the range divided by the velocity of light
$W_d$=Doppler frequency (radians)

Figure 2:
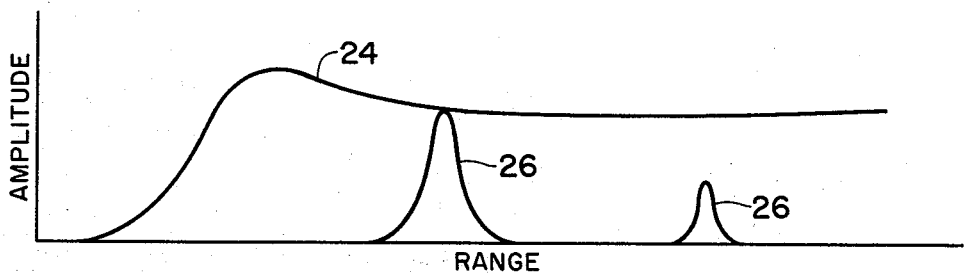
FIGURE 2 shows a graph representing various outputs of the system of FIGURE 1.

The signal (2) is amplified in IF amplifier 17 which is tuned so that only frequencies well above doppler frequencies will be amplified. Considering only the portion of signal (2), cos $[W_d t + \Psi(t) - \Psi(t-\tau)]$, the curve 24 of FIGURE 2 will result. Thus, any signal undergoing zero delay (antenna feed through) will not have an IF output. As can be seen from signal (2), the output of amplifier 17 will be amplitude modulated by $N(t-\tau)$. This signal is detected and correlated in mixer 19 to produce the range returns of targets as shown by curves 26. The peaks of curves 26 are produced when the delay $\tau$ equals the space delay to a target and back. The expression, cos $[W_d t + \Psi(t) - \Psi(t-\tau)]$, is a function of both frequency and range $$\left(\tau = \frac{2d}{C}\right)$$

Figure 3:
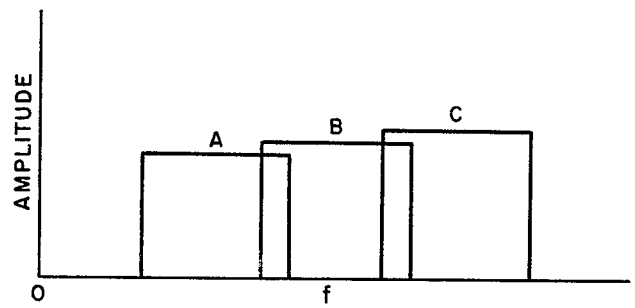
FIGURE 3 shows a graph of frequency pass bands illustrating the principle of operation of the embodiment of FIG. 1.
Figure 4:
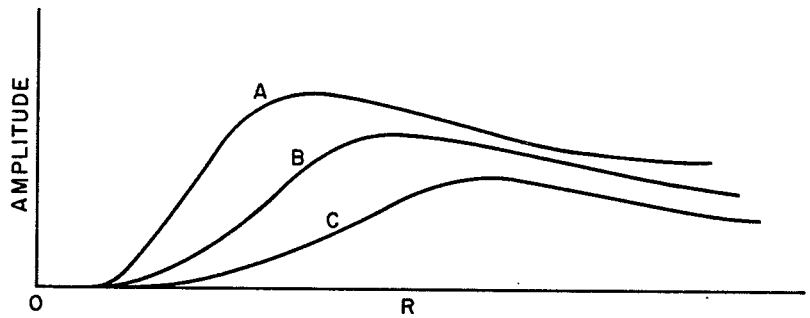
FIGURE 4 shows a graph of range curves resulting from the pass bands of FIG. 3.

When $\tau=0$ (zero range) the expression becomes cos $(W_d t)$ and all the energy is a doppler frequency. Thus if IF amplifier 17 is set so that its pass band is above doppler frequencies, no output will result. As the range increases, the difference frequency $[\Psi(t) - \Psi(t-\tau)]$ will contain some components in the IF band. As the range increases, more energy falls into the pass band of IF amplifier 17. The output peaks at a range dependent on the IF center frequency and the modulation index. Mixer 16 may be of the heterodyne type such as a balanced mixer. The output is proportioned to the weaker signal received at antenna 14 times the cosine of the phase difference (between the signal transmitted from antenna 11 and the signal received at antenna 14). Illustrative pass bands of IF amplifier 17 are shown in FIG. 3 and the family of curves which would result are shown in FIG. 4. Corresponding reference characters are used to denote corresponding curves in FIG. 4 for a frequency band shown in FIG. 3. Frequency band A in FIG. 3 would produce the range curve A of FIG. 4. As can be seen from the expression cos $$[W_d t + \Psi(t) - \Psi(t-\tau)]$$

and the curves in FIG. 4, at zero range, no energy is passed since IF amplifier 17 is tuned above the doppler frequency and this is the only term remaining in the expression.

I claim:

A radar system comprising a transmitter adapted to emit a combined frequency modulated and amplitude modulated radio frequency noise signal and a receiver adapted to receive an echo of said emitted signal from a target; said transmitter comprising a modulator having an oscillator, a frequency modulating signal and an amplitude modulating signal coupled thereto and an output coupled to a transmitting antenna; said receiver comprising a first mixer having a first input coupled to a receiving antenna, a second input coupled directly to the output of said oscillator and an output, an intermediate frequency amplifier tuned to receive signals of frequencies above doppler frequencies and having an input coupled to the output of said first mixer and an output, a detector for detecting the amplitude modulated signal having an input coupled to the output of said intermediate frequency amplifier and an output, variable delay circuit means having an input coupled to said amplitude modulating means and an output, a second mixer having a first input coupled to the output of said detector, a second input coupled to the output of said variable delay circuit means and having an output and integrator means coupled to the output of said second mixer to receive an output pulse from said mixer which in indicative of the range of said target.

References Cited by the Examiner
UNITED STATES PATENTS

| | | | |
|---|---|---|---|
| 2,941,202 | 6/60 | Harris, et al. | 343—100.7 |
| 2,958,862 | 11/60 | Rey | 343—14 |

FOREIGN PATENTS

| | | |
|---|---|---|
| 724,555 | 2/55 | Great Britain. |

CHESTER L. JUSTUS, *Primary Examiner.*